United States Patent [19]

Noso et al.

[11] Patent Number: 4,532,648
[45] Date of Patent: Jul. 30, 1985

[54] SPEECH RECOGNITION SYSTEM FOR AN AUTOMOTIVE VEHICLE

[75] Inventors: Kazunori Noso, Yokosuka; Norimasa Kishi, Yokohama; Toru Futami, Yokosuka, all of Japan

[73] Assignee: Nissan Motor Company, Limited, Kanagawa, Japan

[21] Appl. No.: 428,230

[22] Filed: Sep. 29, 1982

[30] Foreign Application Priority Data

Oct. 22, 1981 [JP] Japan .................. 56-169176

[51] Int. Cl.$^3$ .............................................. G10L 1/00
[52] U.S. Cl. ....................................... 381/41; 381/104
[58] Field of Search .................. 381/41, 43, 47, 104, 381/105; 455/116, 238

[56] References Cited

U.S. PATENT DOCUMENTS 4,100,370 7/1978 Suzuki et al. .
4,158,750 6/1979 Sakoe et al. .
4,239,936 12/1980 Sakoe ..................... 381/43
4,380,824 4/1983 Inoue ..................... 381/47

FOREIGN PATENT DOCUMENTS

2056732 3/1981 United Kingdom .

Primary Examiner—E. S. Matt Kemeny
Attorney, Agent, or Firm—Lowe, King, Price & Becker

[57] ABSTRACT

A speech recognition system for an automotive vehicle which can record or recognize spoken instruction phrases reliably even when engine noise increases high within the passenger compartment. When the engine begins to operate, the gain of an amplifier of a speech input section or the threshold level of a voice detector is so switched as to reduce the sensitivity to spoken instructions. As a result, the driver must necessarily utter a spoken instruction in a louder voice and thus the proportion of noise level to spoken instruction signal level is reduced. The system according to the present invention comprises engine operation detecting means, an analog switch, two amplifiers or two multipliers, etc. in addition to the conventional speech recognizer.

7 Claims, 9 Drawing Figures

SPEECH RECOGNITION SYSTEM FOR AN AUTOMOTIVE VEHICLE

BACKGROUND OF THE INVENTION

1. Field of the Invention

The present invention relates generally to a speech recognition system for an automotive vehicle, and more particularly to a speech recognition system by which a driver's spoken instructions can be reliably recorded or recognized even when engine noise increases within the passenger compartment after the vehicle engine begins to operate.

2. Description of the Prior Art

There is a well-known speech recognizer which can activate various actuators in response to human spoken instructions. When this speech recognizer is mounted on a vehicle, the headlight, for instance, can be turned on or off in response to spoken instructions such as "Headlight on" or "Headlight off". Such a speech recognizer usually can recognize various spoken instructions in order to control various actuators; however, there are some problems involved in applying this system to an automotive vehicle.

Usually, the speech recognizer is used in a relatively quiet environment; however, the speech recognition system for an automotive vehicle is usually used within a relatively noisy passenger compartment and additionally the noise fluctuates intensely therewithin. Therefore, one of the major problems is how to cope with erroneous spoken phrase recordings or recognitions caused by fluctuating engine noise within the passenger compartment.

In the prior-art speech recognizer, since a spoken instruction signal including noise is always amplified on a constant gain factor, when the noise level within the passenger compartment increases, especially when the engine begins to operate and therefore the engine noise is inputted to the speech recognizer at random, the noise mixed with the spoken instruction signal at a relatively high ratio is also amplified together with the spoken instruction signal, thus causing a problem in that the spoken instruction cannot be recognized reliably or is recognized erroneously to operate a wrong vehicle device actuator.

Furthermore, in order to distinguish a spoken instruction from noise, conventionally there is provided a voice detector in the speech recognizer, by which the start and the end of a spoken instruction are determined by detecting whether the magnitude of a spoken instruction signal exceeds a predetermined reference threshold voltage level for a predetermined period of time or whether the magnitude of the spoken instruction signal drops below the predetermined reference threshold voltage level for another predetermined period of time, respectively.

In the prior-art speech recognizer, however, since the reference threshold voltage level is fixed, when noise signal level is high, for instance, when the vehicle is running and therefore the noise level exceeds the reference threshold voltage level for a long time, there exists a problem in that the voice detector can erroneously consider this state to represent the beginning of a spoken instruction. In other words, the prior-art speech recognizer is prone to erroneous recognition due to intense noise within the passenger compartment.

A more detailed description of a typical prior-art speech recognizer and a typical prior-art voice detector will be made with reference to the attached drawings in conjunction with the present invention under DETAILED DESCRIPTION OF THE PREFERRED EMBODIMENTS.

SUMMARY OF THE INVENTION

With these problems in mind, therefore, it is the primary object of the present invention to provide a speech recognition system for an automotive vehicle which can record or recognize spoken instruction phases reliably even when engine noise increases within the passenger compartment. In more detail, when the engine begins to operate, the gain of an amplifier in the speech input section or the threshold level of the voice detector section is so switched as to reduce the sensitivity to spoken instructions. As a result, the driver must necessarily utter a spoken instruction in a louder voice and thus the proportion of noise level to spoken instruction signal level is reduced.

To achieve the above mentioned object, the speech recognition system for an automotive vehicle according to the present invention comprises an engine operation detector or a speed sensor, an analog switch, two amplifiers having different gain factors respectively or two multipliers having different multiplication ratio respectively, etc., in addition to or in place of the elements or sections of the conventional speech recognizer.

BRIEF DESCRIPTION OF THE DRAWINGS

The features and advantages of the speech recognition system for an automotive vehicle according to the present invention will be more clearly appreciated from the following description taken in conjunction with the accompanying drawings in which like reference numerals designate corresponding elements or sections throughout the drawings and in which.

DETAILED DESCRIPTION OF THE PREFERRED EMBODIMENTS

To facilitate understanding of the present invention, a brief reference will be made to the principle or operation of a typical prior-art speech recognizer, with reference to FIG. 1.

Figure 1:
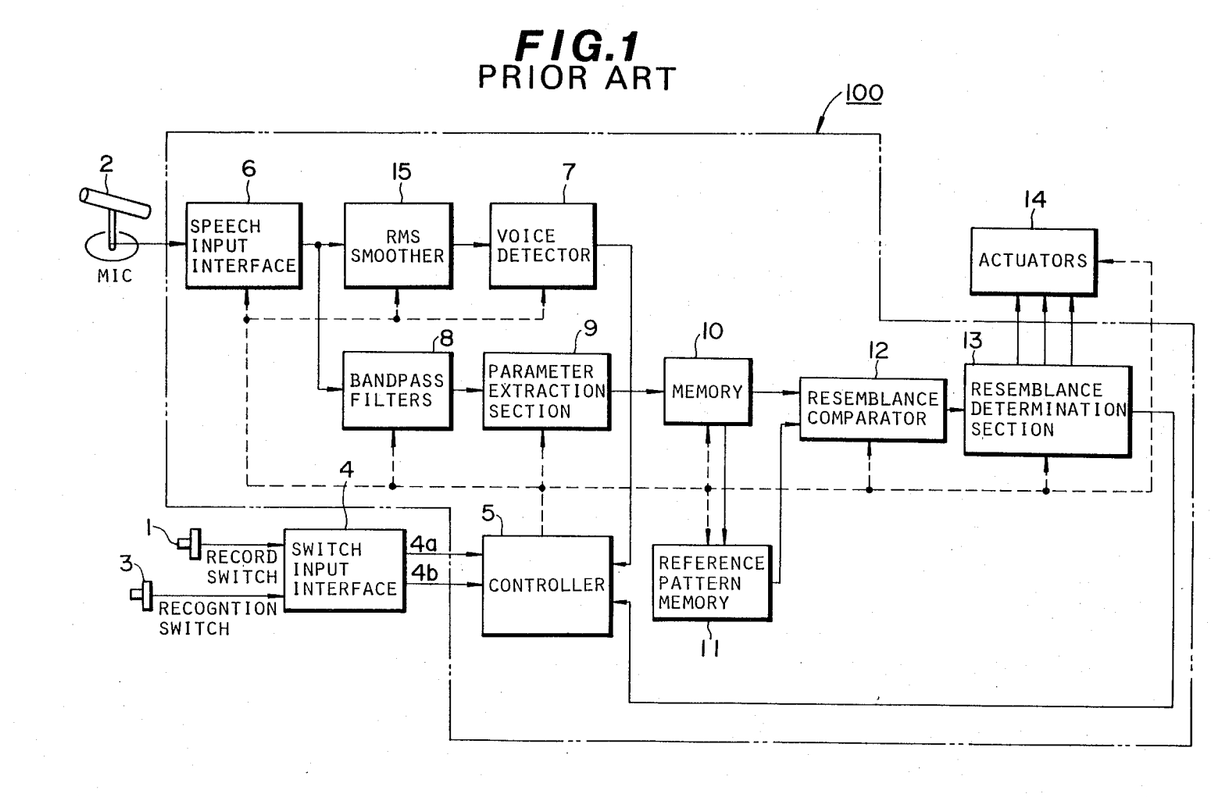
FIG. 1 is a schematic block diagram of a typical prior-art speech recognizer for assistance in explaining the operations thereof.

FIG. 1 shows a schematic block diagram of a typical speech recognizer 100. To use the speech recognizer, the user must first record a plurality of predetermined spoken instructions. Specifically, in this spoken instruction recording mode (reference mode), the user first depresses a record switch 1 disposed near the user. When the record switch 1 is depressed, a switch input interface 4 detects the depression of the record switch 2 and outputs a signal to a controller 5 via a wire 4a. In response to this signal, the controller 5 outputs a recording mode command signal to other sections in order to preset the entire speech recognizer to the recording mode. In the spoken instruction recording mode, when the user says a phrase to be used as a spoken instruction, such as "open doors", near a microphone 2, the spoken phrase is transduced into a corresponding electric signal through the microphone 2, amplified through a speech input interface 6 consising mainly of a spectrum-normalizing amplifier, smoothed through a root-mean-square (RMS) smoother 15 including a rectifier and a smoother, and finally inputted to a voice detector 7.

The spectrum-normalizing amplifier amplifies the input at different gain levels at different frequencies, so as to adjust the naturally frequency-dependent power spectrum of human speech to a more nearly flat power spectrum. This voice detector 7 detects whether or not the magnitude of the spoken phrase signal exceeds a predetermined level for a predetermined period of time (150 to 250 ms) in order to recognize the start of the spoken phase input signal and whether or not the magnitude of the signal drops below a predetermined level for a predetermined period of time (about 300 ms) in order to recognize the end of the signal. Upon detection of the start of the signal, this voice detector 7 outputs another recording mode command signal to the controller 5. In response to this command signal, the controller 5 activates a group of bandpass filters 8, so that the spoken phrase signal from the microphone 2 is divided into a number of predetermined frequency bands. Given to a parameter extraction section 9, the frequency-divided spoken phrase signals are squared or rectififed therein in order to derive the voice power spectrum across the frequency bands and then converted into corresponding digital time-series matrix-phonetic pattern data (explained later). These data are then stored in a memory unit 10. In this case, however, since the speech recognizer is set to the spoken instruction recording mode by the depression of the record switch 1, the time-series matrix-phonetic pattern data are transferred to a reference pattern memory unit 11 and stored therein as reference data for use in recognizing the speech instructions.

After having recorded the reference spoken instructions, the user can input speech instructions, such as "open doors", to the speech recognizer through the microphone 2 while depressing a recognition switch 3.

When this recognition switch 3 is depresssed, the switch input interface 4 detects the depression of the recognition switch 3 and outputs a signal to the controller 5 via a wire 4b. In response to this signal, the controller 5 outputs a recognition mode command signal to other sections in order to preset the entire speech recognizer to the recognition mode. In this spoken phrase recognition mode, when the user says an instruction phrase similar to the one recorded previously near the microphone 2 and when the voice detector 7 outputs a signal, the spoken instruction is transduced into a corresponding electric signal through the microphone 2, amplified through the speech input interface 6, filtered and divided into voice power spectra across the frequency bands through the band pass filters 8, squared or rectified and further converted into corresponding digital time-series matrix-phonetic pattern data through the parameter extraction section 9, and then stored in the memory unit 10, in the same manner as in the recording mode.

Next, the time-series matrix-phonetic pattern data stored in the memory unit 10 in the recognition mode are sequentially compared with the time-series matrix-phonetic pattern data stored in the reference pattern memory unit 11 in the recording mode by a resemblance comparator 12. The resemblance comparator 12 calculates the level of correlation of the inputted speech instruction to the reference speech instruction after time normalization and level normalization to compensate for variable speaking rate (because the same person might speak quickly and loudly at one time but slowly and in a whisper at some other time). The correlation factor is usually obtained by calculating the Tchebycheff distance (explained later) between recognition-mode time-series matrix-phonetic pattern data and recording-mode time-series matrix-phonetic pattern data. The correlation factor calculated by the resemblance comparator 12 is next given to a resemblance determination section 13 to determine whether or not the calculated values lie within a predetermined range, that is, to evalutate this cross-correlation. If within the range, a command signal, indicating that a recognition-mode spoken instruction has adequate resemblance to one of the recorded instruction phrases, is outputted to one of actuators 14 in order to open the vehicle doors, for instance. The above-mentioned operations are all executed in accordance with command signals outputted from the controller 5.

Description has been made hereinabove of the case where the speech recognizer 100 comprises various discrete elements or sections; however, it is of course possible to embody the speech recognizer 100 with a microcomputer including a central processing unit, a read-only memory, a random-access memory, a clock oscillator, etc. In this case, the voice detector 7, the parameter extraction section 9, the memory 10, the reference pattern memory 11, the resemblance comparator 12 and the resemblance determination section 13 can all be incorporated within the microcomputer, executing the same or similar processes, calculations and/or operations as explained hereinabove.

The digital time-series matrix-phonetic pattern data and the Tchebycheff distance are defined as follows:

In the case where the number of the bandpass filters is four and the number of time-series increments for each is 32, the digital recording-mode time series matrix-phonetic pattern data can be expressed as $$F(A) = f(i,j) = \begin{vmatrix} f(1,1), f(1,2), f(1,3) \ldots, f(1,32) \\ f(2,1), f(2,2), f(2,3) \ldots, f(2,32) \\ f(3,1), f(3,2), f(3,3) \ldots, f(3,32) \\ f(4,1), f(4,2), f(4,3) \ldots, f(4,32) \end{vmatrix}$$

where A designates a first recording-mode speech instruction (reference) (e.g. OPEN DOORS), i denotes the filter index, and i denotes time-series increment index.

If a first recognition-mode speech instruction (e.g. OPEN DOORS) is denoted by the character "B", the Tchebycheff distance can be obtained from the following expression:

$$l = |F(A) - F(B)| = \sum_{i=1}^{4} \sum_{j=1}^{32} |f_A(i,j) - f_B(i,j)|$$

Figure 2:
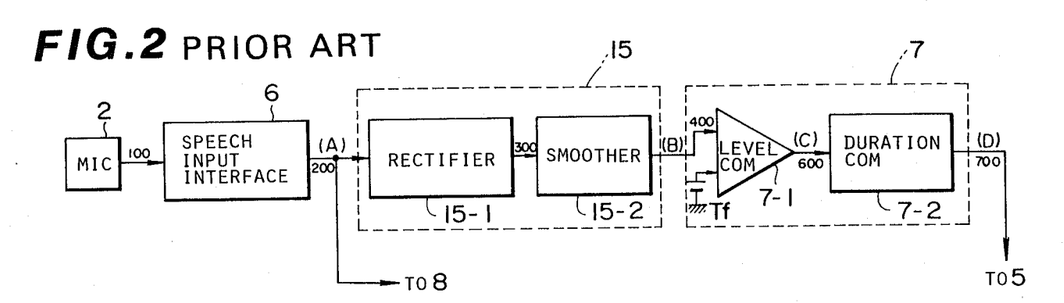
FIG. 2 is a schematic block diagram of a detailed portion of the voice detecting means of the prior-art speech recognizer shown in FIG. 1.

FIG. 2 shows in more detail the speech detection section of the voice detecting means of the prior-art speech recognizer shown in FIG. 1, which is closely relevant to the present invention.

Figure 3A:
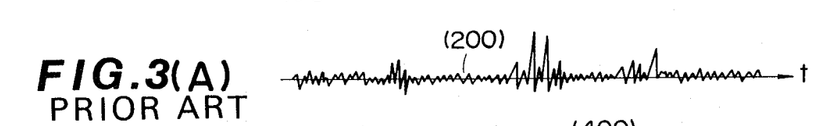
FIG. 3(A) is a graphical representation of the waveforms of a spoken instruction signal including noise as measured at point (A) in FIG. 2.

In the figure, a spoken phrase inputted via a microphone and transduced into a corresponding electric signal (100) first passes through the speech input interface 6. The interface 6 is mainly made up of a spectrum-normalizing amplifier by which the electric signal is amplified to a greater degree at higher frequencies. This is because speech sounds tend to be attenuated greatly in the higher frequency range. The waveform of the spoken instruction signal (200) including noise outputted from the spectrum-normalizing amplifier 6 may appear as shown in FIG. 3(A).

Figure 3B:
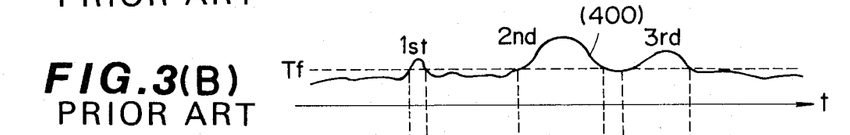
FIG. 3(B) is a graphical representation of the waveforms of the spoken instruction signal including noise and a reference threshold voltage level as measured at point (B) in FIG. 2.

The amplified spoken instruction signal (200) is next applied to the bandpass filters 8 to begin the process of recognizing whether the signal is a correctly spoken instruction and to the RMS smoother 15, consisting mainly of a rectifier 15-1 and a smoother 15-2, to begin the process of detecting the start and end of the spoken phrase. The rectified and smoothed spoken instruction signal (400) may appear as shown in FIG. 3(B), in which $T_f$ denotes a constant reference threshold voltage level.

The smoothed signal (400) is then conducted to the voice detector 7 including a voltage level comparator 7-1 and a pulse duration comparator 7-2. The voltage level comparator 7-1 comprises the voltage level of the smoothed signal with the predetermined reference threshold voltage level $T_f$ and outputs a H-voltage level pulse signal (600) only while the voltage level of the speech instruction signal exceeds the reference threshold level $T_f$ as depicted in FIG. 3(C).

The pulse duration comparator 7-2 compares the pulse width of the H-voltage level pulse signal (600) with a predetermined reference spoken instruction start time $t_s$ and the pulse width of the L-voltage level pulse signal (600) with another predetermined reference end time $t_e$ and outputs a H-voltage level signal (700) only when the H-voltage level pulse width exceeds the reference start time $t_s$ and a L-voltage level signal (700) only when the L-voltage level pulse width exceeds the reference end time $t_e$.

Figure 3C:
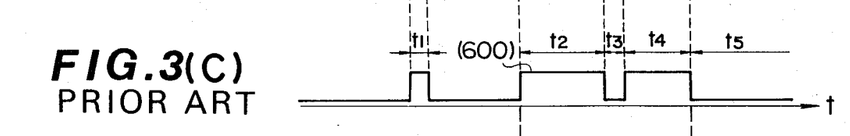
FIG. 3(C) is a graphical representation of the waveform of the spoken instruction pulse signal as measured at point (C) in FIG. 2.
Figure 3D:
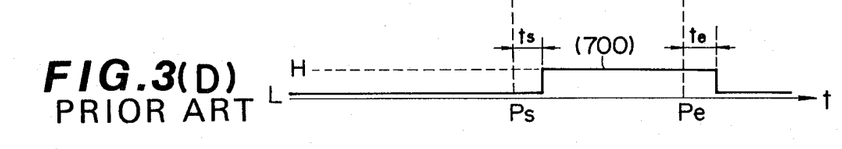
FIG. 3(D) is a graphical representation of the waveform of the spoken instruction start/end signal as measured at point (D) in FIG. 2.

To explain in more detail with reference to FIGS. 3(C) and (D), if the pulse width of the first H-voltage level pulse signal is labeled $t_1$, since $t_1$ is shorter than the reference start time $t_s$, the pulse duration comparator 7-2 outputs no H-voltage level signal. On the other hand, if the pulse width of the second H-voltage level pulse signal is labeled $t_2$, since $t_2$ is longer than the reference start time $t_s$, the pulse duration comparator 7-2 outputs a H-voltage level signal, indicating the start of a spoken instruction. In this case, the H-voltage level start signal (700) from the pulse duration comparator 7-2 is delayed by the reference start time $t_s$ after the actual start time $P_s$ of the spoken instruction. Thereafter, this H-voltage level start signal is outputted until the duration comparator 7-2 detects the end of speech instruction.

Next, when the H-voltage level pulse signal $t_2$ changes to a L-voltage level for a period of time $t_3$, since the $t_3$ is shorter than the reference end time $t_e$, the pulse duration comparator 7-2 outputs no L-voltage level signal, that is, during comparator 7-2 sustains the H-voltage level signal.

Thereafter in this case, even if a third pulse signal having a pulse width $t_4$ is outputted again from the voltage level comparator 7-1, since the pulse duration comparator 7-2 is still outputting a H-voltage level signal, the operation of the duration comparator 7-2 is not effected.

Next, when the H-voltage level pulse signal $t_4$ changes to a L-voltage level for a period of time $t_5$, since $t_5$ is longer than the reference end time $t_e$, the pulse duration comparator 7-2 outputs a L-voltage level signal, indicating the end of speech instruction. In this case, the L-voltage level end signal from the duration comparator 7-2 is delayed by the reference end time $t_e$ after the actual end time $P_e$ of speech instruction. Thereafter, the end signal is outputted until the duration comparator 7-2 detects the start of another speech instruction.

In response to the H-voltage level signal from the duration comparator 7-2 as shown in FIG. 3(D), the controller 5 outputs a command signal to activate a group of bandpass filters 8 and other sections to recognize the spoken instruction signal outputted from the spectrum-normalizing amplifier 6, as already explained.

In the prior-art voice detecting means connected to the microphone as described above, since the reference threshold level in the voltage level comparator 7-1 is fixed at a predetermined level, the speech recognizer cannot cope well with the fluctuations of noise level within the passenger compartment, with the result that accurate detection of speech instruction start and end is comprised so that noise may be interpreted as attempts at speech and/or spoken instructions may be ignored.

In view of the above description and with reference to the attached drawings, the embodiments of the speech recognition system for an automotive vehicle according to the present invention will be described hereinbelow.

Figure 4:
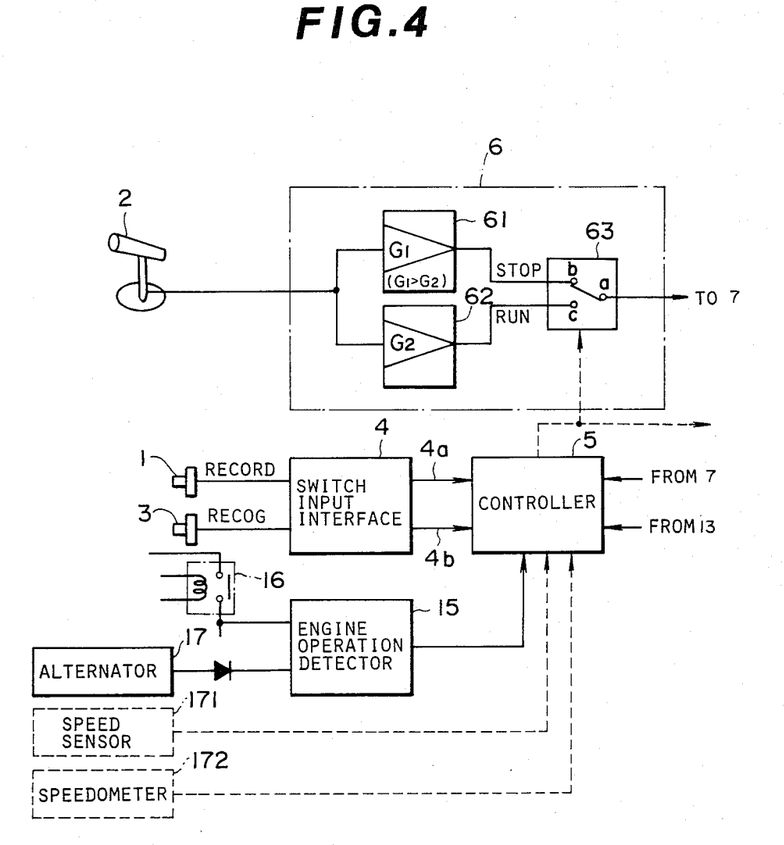
FIG. 4 is a schematic block diagram of a first embodiment of the speech recognition system according to the present invention, in which only an essential portion of the system is shown together with an engine operation detector and in which two amplifiers are switched in the speech input section.

FIG. 4 is a block diagram showing a first embodiment of the present invention. In brief summation of this embodiment, the gain factor of the speech input interface is adjusted according to the engine operation; that is, the gain factor is reduced while the engine is operating.

As in the conventional speech recognizer 100, there are provided a record switch 1, a microphone 2, a recognition switch 3, a switch input interface 4, and a controller 5. In addition to these elements, there are provided first and second amplifers 61 and 62 having first and second gains $G_1$ and $G_2$ in the speech input interface 6 for amplifying and outputting the spoken instruction signal from the microphone 2, the first gain $G_1$ being determined to be higher than the second gain $G_2$. The outputs of the amplifiers 61 and 62 are inputted to an analog switch 63. As understood later, the fixed contact a of this analog switch 63 is switched to the contact b as shown in FIG. 4 when the engine stops operating, but switched to the contact c when the engine is operating. Therefore, when the engine stops, the gain factor for the spoken instruction signal is high; when the engine is running, the gain factor for the spoken instruction signal is switched into being lower.

On the other hand, there are provided an engine operation detector 20, an ignition relay 16 having a relay contact closed when the ignition switch is turned on, and an alternator 17, in order to detect the engine condition and to switch the analog switch 63. The engine operation detector 20 detects that the engine is operating and outputs a signal to the controller 5 when the ignition relay 16 is energized and also the alternator 17 outputs a signal. In response to this signal, the controller 5 sets the analog switch 63 to the amplifier 62 side. On the other hand, when the ignition relay 16 is deenergized and the alternator 17 outputs no signal, the engine operation detector 20 detects that the engine stops and outputs no signal to the controller 5. In response to this, the controller 5 sets the analog switch 63 to the amplifier 61 side as shown.

Further, the reason why the alternator output signal is given to the engine operation detector 20 is that the alternator output is indicative of the engine operation condition because the alternator outputs a signal when the ignition switch is set to the starter position and therefore the engine starts rotating.

In the system according to the present invention, however, it is also possible to apply an output signal generated from a vehicle speed sensor 171 or a speedometer 172 to the controller 5, because the sensor or meter can also represent whether or not the engine or vehicle is running.

Next, the operation of the first embodiment of FIG. 4 will be described. When a spoken instruction is uttered toward the microphone 2 with the record switch 1 or the recognition switch 3 turned on when the engine stops, since the engine operation detector 20 detects that the engine is stopped, the controller 5 sets the analog switch 63 to the amplifier 61 side. Therefore, the spoken instruction signal from the microphone 2 is amplified on the basis of the first gain $G_1$ preset in the first amplifier 61.

In contrast with this, in the state where the engine is operating and therefore the vehicle is running, since the engine operation detector 20 detects that the vehicle is running and outputs a signal, the controller 5 switches the analog switch 63 to the second amplifier 62 side. Therefore, the spoken instruction signal from the microphone 2 is amplified on the basis of the second gain $G_2$ lower than the first gain $G_1$ preset in the first amplifier 61.

Since the second gain $G_2$ is relatively low as compared with the first gain $G_1$, in order to obtain a spoken instruction signal exceeding a predetermined level necessary for recording or recognizing, the driver must necessarily utter a spoken instruction toward the microphone 2 in a louder voice as compared with the case where the engine stops. Therefore, even if noise level within the passenger compartment is high due to engine operation, the level of a spoken instruction becomes naturally high in comparison with a rise in noise level.

As a result, the proportion of noise level to spoken instruction signal level is reduced, thus improving the recording or recognition rate of a spoken instruction in the speech recognition system.

Figure 5:
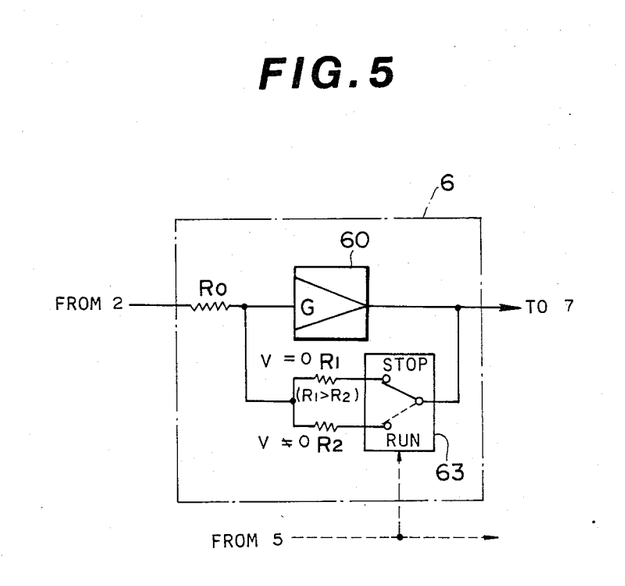
FIG. 5 is a schematic block diagram of a second embodiment of the speech recognition system according to the present invention, in which only an essential portion of the system is shown and in which two feedback resistors are switched in the speech input section.

FIG. 5 is a block diagram showing a second embodiment of the present invention, in which a feedback resistor for the amplifier is switched according to the engine operation; that is, the gain factor is reduced while the engine is operating.

In this second embodiment, only one amplifier 60 is provided for the speech input interface 6; however, two feedback resistors $R_1$ and $R_2$ are connected to the input terminal of the amplifier 60 and selectively connected to the output terminal of the amplifier 60 via the analog switch 63 in response to the signal from the controller 5.

In more detail, when the ignition relay 16 is deenergized and the alternator 17 outputs no signal, the engine operation detector 20 detects that the engine stops and outputs no signal to the controller 5.

Therefore, the analog switch 63 is set to the first resistor side $R_1$, as shown by a solid line in FIG. 5. The larger the feedback resistor, the higher the gain of the amplifier. Since the first resistor $R_1$ is predetermined to be larger than the second resistor $R_2$, the gain factor G of the amplifier 60 becomes high when the resistor $R_1$ is connected between input and output terminals thereof. Further, in this case, the gain factor is determined as a function of the input resistor Ro and the feedback resistor $R_1$ or $R_2$. When the analog switch 63 is set to the first resistor side $R_1$, the spoken instruction signal from the microphone 2 is amplified on the basis of a higher gain.

Accordingly, even if the driver utters a spoken instruction in a low voice, the inputted spoken instruction phrase can be recorded or recognized reliably.

In contrast with this, where the engine is operating, since the controller 5 sets the analog switch 63 to the second resistor side $R_2$ which is smaller than $R_1$, the spoken instruction is amplified on the basis of a lower gain.

Accordingly, since the driver must necessarily utter a spoken instruction in a louder voice, even if noise level is high due to engine operation, the inputted spoken instruction phrase can be recorded or recognized reliably.

In other words, by changing the gain factor of the amplifier in dependence upon selection of feedback resistors, it is possible to reduce the proportion of noise level to spoken instruction signal level in the case where the engine is operating, in the same way as in the first embodiment.

Figure 6:
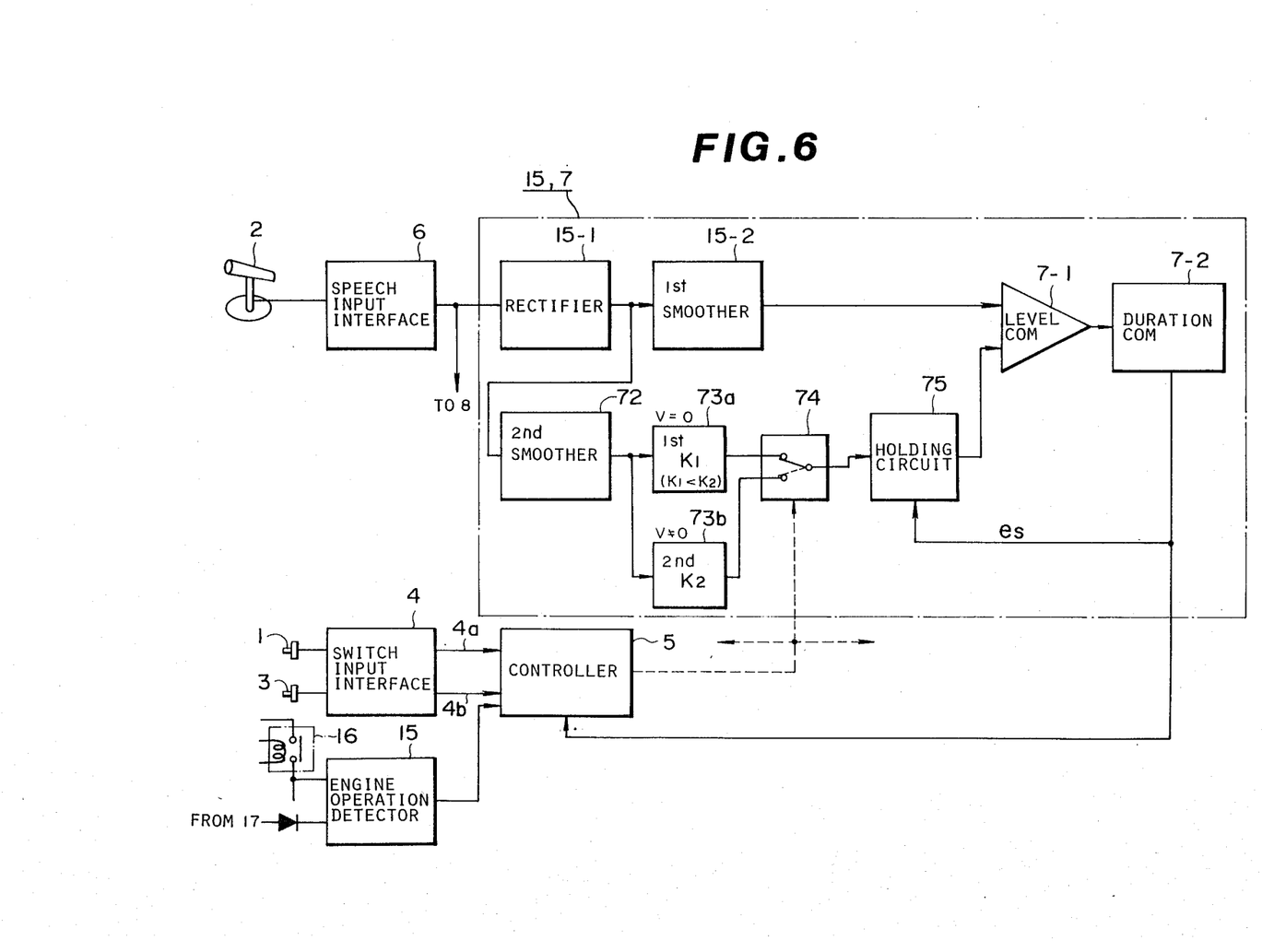
FIG. 6 is a schematic block diagram of a third embodiment of the speech recognition system according to the present invention, in which only an essential portion of the system is shown together with an engine operation detector and in which two multipliers are switched in the speech input section.

FIG. 6 is a block diagram showing a third embodiment of the present invention, in which the reference threshold level of the voltage level comparator 7-1 in the voice detector is switched according to the engine operation, that is, the multiplication ratio is increased when the engine is operating.

As in the conventional speech recognizer 100, there are provided a record switch 1, a microphone 2, a recognition switch 3, a switch input interface 4, a controller, a RMS smoother (a first smoother), a voice detector etc. In addition to these elements, there are provided a second smoother 72, first and second multipliers 73a and 73b, an analog switch 74 and a holding circuit 75.

In the same way as in the first embodiment of FIG. 4, the output signal of the engine operation detector 15 is given to the controller 5 so as to detect the engine conditions. The voice detector 7 for detecting the start point and the end point of a spoken instruction signal from the speech input interface 6 and for outputting a start command signal and an end command signal comprises a rectifier 15-1 for rectifying the spoken instruction signal, a first smoother 15-2 for smoothing the output signal from the rectifier 15-1 at a time constant of 10 to 20 milliseconds and for outputting a DC voltage roughly corresponding to the spoken instruction, a second smoother 72 for smoothing the output signal from the rectifier 15-1 at a time constant of about one to second and for outputting a DC voltage roughly corresponding to noise included in the spoken signal, first and second multipliers 73a and 73b for multiplying the output signal from the second smoother 72 at multiplication ratios of $K_1$ and $K_2$ ($K_1 < K_2$), an analog switch 74 for selecting the output from the multipliers 73a and 73b in response to the signal from the engine operation detector 20, a holding circuit 75 for holding the output signal from either of two multipliers 73a and 73b via the analog switch 74 when a start of a spoken instruction is detected, a level comparator 7-1 for comparing the DC voltage signal corresponding to the spoken instruction signal from the first smoother 15-2 with a reference signal $e_r$ of the DC voltage corresponding to noise level given via the holding circuit 75 and for outputting a spoken instruction start signal when the output level from the first smoother 15-2 exceeds the reference signal $e_r$, and a pulse duration comparator 7-2 for outputting a spoken instruction start signal $e_s$ indicative of presence of a spoken instruction signal to the controller 5 when the H-level output from the level comparator 7-1 is kept outputted, for instance, for more than 150 milliseconds and a spoken instruction end signal $e_e$ indicative of absence of a spoken instruction signal to the controller 5 when the output signal from the level comparator 7-1 drops to a L-level and is kept dropped for about 250 milliseconds. In this voice detector 7, the analog switch 74 is switched to the first multiplier 73a side when the engine operation detector 20 detects that the engine is stopped, as shown by a solid line, and to the second multiplier 73b side when the engine operation detector 20 detects that the engine is operating, as shown by a broken line in FIG. 6. Further, the holding circuit 75 first outputs the signal obtained from the multiplier 73a or 73b via the analog switch 74 to the level comparator 7-1 as the reference signal $e_r$; however, once the pulse duration comparator 7-2 outputs a start signal $e_s$, since the signal from the multiplier 73a or 73b is held in response to this start signal $e_s$ (i.e. holding signal), the holding circuit keeps outputting the held signal as the reference signal $e_r$ to the level comparator 7-1, until an end signal $e_e$ is outputted to the holding circuit 75.

The reason why such a holding circuit 75 as described above is additionally provided is as follows: unless there is provided the holding circuit 75, when the reference end threshold level increases, the smoothed signal (400) drops below the threshold level before the end of spoken instruction, thus resulting in an erroneous spoken instruction end detection. In other words, since the time constant of the second smoother 72 is larger than that of the first smoother 15-2, the reference threshold level increases gradually with a time delay as the smoothed spoken instruction signal (400) increases gradually; that is, the timing of two signals does not match.

Next, there will be described the operation of the third embodiment of FIG. 6.

When a spoken instruction is uttered toward the microphone with the record switch 1 or recognition switch 3 turned on in the state where the engine is stopped, the engine operation detector 20 detects that the engine is stopped, and therefore the analog switch 74 is set to the first multiplier 73a side via the controller 5. The spoken instruction transduced into an electric signal through the microphone 2 is rectified through the rectifier 15-1 after amplification by the speech input interface 6. The first smoother 15-2 outputs a DC voltage corresponding to the power component of the spoken instruction signal. On the other hand, the second smoother 72 applies a DC voltage proportional to the power level of background noise included in the spoken instruction signal to the multipliers 73a and 73b. At this time, since the analog switch 74 is closed to the first multiplier 73a side, the output signal from the second smoother 72 is taken out being multiplied by $K_1$ times through the first multiplier 73a, and is given to the level comparator 7-1 via the analog switch 74 and the holding circuit 75 as the reference signal $e_r$. The level comparator 7-1 outputs a H-level output signal when the output of the first smoother 15-2 exceeds the reference signal $e_r$. If this H-level output signal is kept outputted, for instance, for about 150 milliseconds, a start signal $e_s$ for spoken instruction recognition or recording is applied to the controller 5; the spoken instruction signal branched from the output of the speech input interface 6 is inputted to the bandpass filters 8; the spoken instruction is recorded or recognized by the same circuit sections as in the prior-art system. Further, when the pulse duration comparator 7-2 outputs the start signal $e_s$, the output signal of the first multiplier 73a is held by the holding circuit 75 and the reference signal $e_r$ for the level comparator 7-1 is fixed. Next, when the input of the spoken instruction has been completed, the output of the level comparator 7-1 returns to a L-level. If this L-level state continues, for instance, for about 250 milliseconds, the pulse duration comparator 7-2 outputs an end signal $e_e$ to the controller 5. The controller 5 determines that the input of the spoken instruction has been completed and controls the entire system so as to begin to process the recording or recognition of the spoken instruction.

On the other hand, when a spoken instruction is inputted in the same way in the state where the engine is operating, since the engine operation detector 20 detects the state where the vehicle is running, the analog switch 74 is set to the second multiplier 73b side. Therefore, the DC signal corresponding to background noise power level included in the spoken instruction and given from the second smoother 72 is multiplied at a multiplication ratio $K_2$ greater than $K_1$ and is applied to the level comparator 7-1 as a reference signal $e_r$. Therefore, since the level of the reference signal $e_r$ is adjusted to a higher level, as compared with that obtained when the engine is stopped, in the level comparator 7-1, only when a spoken instruction exceeds this reference signal $e_r$, that is, a relatively loud spoken instruction is inputted, the level comparator 7-1 generates a H-level output signal. Also, a loud voice makes clear the features of voice parameters. Therefore, in the state where the engine is operating, that is, where the vehicle is running and therefore noise within the passenger compartment is high, unless a relatively loud spoken instruction is uttered toward the microphone 2, no recognition or recording is made. If a spoken instruction having high energy is inputted, even when the ambient noise level is high, the proportion of noise component to the spoken instruction signal is sufficiently reduced, so that it is possible to record or recognize the spoken instruction more reliably.

In the embodiments described above, the gain of the speech input interface or the multiplication ratio in the voice detector is switched digitally being classified into a state wherein the engine is stopped and into a state wherein the engine is operating. However, it is also possible to adjust the gain or multiplication ratio analogically according to the magnitude of noise level.

Description has been made hereinabove of the case where the speech recognition system according to the present invention comprises various discrete elements or sections; however, it is of course possible to embody the system with a microcomputer including a central processing unit, a read-only memory, a random-access memory, a clock oscillator, etc. In this case, the engine operation detector, the second smoother, the first and second multipliers, the analog switch, the holding circuit, etc. can all be incorporated within the microcomputer, executing the same or similar processes, calculations and/or operations as explained hereinabove. In such case, the microcomputer also executes various operations necessary for the speech recognizer in accordance with appropriate software stored in the read-only memory.

As described above, in the speech recognition system according to the present invention, since the amplifier gain in the speech input interface or the threshold level in the voice detector is so adjusted that the sensitivity to spoken instruction can be reduced and therefore since the driver must necessarily utter a spoken instruction in a louder voice to reduce the proportion of noise level to spoken instruction signal level, in the case where the engine is operating, even if noise level within the passenger compartment rises intensely, it is possible to improve reliability in recording or recognition rate of a spoken instruction in the speech recognition system.

It will be understood by those skilled in the art that the foregoing description is in terms of preferred embodiments of the present invention wherein various changes and modifications may be made without departing from the spirit and scope of the invention, as is set forth in the appended claims.

What is claimed is:

1. A speech recognition system for an automotive vehicle for recording or recognizing a spoken instruction received through a microphone and for activating a vehicle actuator in response to a recognized spoken instruction, which comprises:
   (a) means for detecting whether or not an automotive vehicle engine is operating and outputting one of an engine operating signal and an engine stopped signal;
   (b) a speech input and voice detection section connected to the microphone for amplifying a spoken instruction signal transduced through the microphone, detecting the start and end of a spoken instruction, and outputting an instruction start command signal and an instruction end command signal, respectively, in response to detection thereof, at least one of the gain factor in said speech input section and the threshold level in said voice detection section being so adjusted that the sensitivity to spoken instructions can be reduced and that the driver must necessarily utter a spoken instruction in a louder voice to reduce the proportion of noise level to spoken instruction signal level, when said engine operation detecting means outputs said engine operating signal; and
   (c) a voice analysis section connected to said speech input and voice detection section and responsive to instruction start and instruction end command signals for analyzing the spoken instruction signal from said speech input section, comparing the results of analysis with predetermined reference values corresponding to at least one spoken instruction, and activating at least one actuator when the results of analysis match predetermined reference values associated with the actuator.

2. A speech recognition system for an automotive vehicle as set forth in claim 1, wherein said engine operation detecting means comprises:
   (a) an ignition relay switch closed when an ignition switch is turned on and for outputting an ignition signal;
   (b) an alternator for outputting an alternator signal when an engine is operating; and
   (c) an engine operation detector connected to said ignition relay switch and said alternator for outputting an engine operation signal in response to the ignition signal and the alternator signal.

3. A speech recognition system for an automotive vehicle as set forth in claim 1, wherein said engine operation detecting means is a speed sensor.

4. A speech recognition system for an automotive vehicle as set forth in claim 1, wherein said engine operation detecting means is a speedometer.

5. A speech recognition system for an automotive vehicle as set forth in claim 1, wherein said speech input section comprises:
   (a) a first amplifier connected to the microphone;
   (b) a second amplifier connected to the microphone for amplifying the spoken instruction signal transduced via the microphone, the gain factor of which is smaller than that of said first amplifier; and
   (c) an analog switch for connecting said first amplifier to said voice detection section in response to the engine stop signal from said engine operation detecting means and for connecting said second amplifier to said voice detection section in response to the engine operation signal from said engine operation detecting means.

6. A speech recognition system for an automotive vehicle as set forth in claim 1, wherein said speech input section comprises:
   (a) an amplifier connected between the microphone and said voice detection section for amplifying the spoken instruction signal transduced via the microphone;
   (b) a first feedback resistor $R_1$ connected to the input terminal of said amplifier;
   (c) a second feedback resistor $R_2$ connected to the input terminal of said amplifier, the resistance value of which is smaller than that of said first feedback resistor; and
   (d) an analog switch for connecting said first feedback resistor $R_1$ to the output of said amplifier in response to the engine stop signal from said engine operation detecting means and for connecting said second feedback resistor $R_2$ to the output of said amplifier in response to the engine operation signal from said engine operation detecting means.

7. A speech recognition system for an automotive vehicle as set forth in claim 1, wherein said voice detection section comprises:
   (a) a first smoother connected to said speech input section for smoothing the spoken instruction signal amplified via said speech input section;
   (b) a second smoother connected to said speech input section for smoothing the spoken instruction signal amplified via said speech input section, the time constant of which is larger than that of said first smoother;
   (c) a first multiplier connected to said second smoother;
   (d) a second multiplier connected to said second smoother, the multiplication ratio of which is greater than that of said first multiplier;
   (e) an analog switch connected to said first multiplier for outputting the smoothed spoken instruction signal multiplied by said first multiplier in response to the engine stop signal from said engine operating detecting means and connected to said second multiplier for outputting the smoothed spoken instruction signal multiplied by said second multiplier in response to the engine operation signal from said engine operating detecting means;
   (f) a holding circuit connected to said analog switch for holding the smoothed spoken instruction signal passed through said analog switch as a reference threshold level in response to an instruction start command signal;
   (g) a voltage level comparator one input terminal of which is connected to said first smoother and the other input terminal of which is connected to said holding circuit, for comparing the spoken instruction signal voltage level smoothed by said first smoother with the reference threshold level outputted from said holding circuit and outputting a H-level signal when the signal voltage level smoothed by said first smoother exceeds the reference threshold level; and
   (h) a pulse duration comparator connected to said voltage level comparator for comparing the pulse width of the H-level signal from said level comparator with a reference start time and outputting a spoken instruction start command signal when the pulse width exceeds the reference start time and for comparing the pulse width of the L-level signal from said level comparator with a reference end time and outputting a spoken instruction end command signal when the pulse width exceeds the reference end, time, the spoken instruction start command signal being applied to said holding circuit as a holding signal.

* * * * *